(12) United States Patent
Sorkin

(10) Patent No.: US 10,995,494 B2
(45) Date of Patent: May 4, 2021

(54) APPARATUS FOR REPAIRING A TENSION MEMBER

(71) Applicant: Felix Sorkin, Stafford, TX (US)

(72) Inventor: Felix Sorkin, Stafford, TX (US)

( * ) Notice: Subject to any disclaimer, the term of this patent is extended or adjusted under 35 U.S.C. 154(b) by 0 days.

(21) Appl. No.: 16/876,011

(22) Filed: May 16, 2020

(65) Prior Publication Data
US 2020/0378121 A1 Dec. 3, 2020

Related U.S. Application Data

(60) Provisional application No. 62/930,686, filed on Nov. 5, 2019, provisional application No. 62/864,885, filed on Jun. 21, 2019, provisional application No. 62/853,602, filed on May 28, 2019.

(51) Int. Cl.
| | |
|---|---|
| *E04C 5/12* | (2006.01) |
| *B29C 73/24* | (2006.01) |
| *E04G 21/12* | (2006.01) |
| *E04G 23/02* | (2006.01) |

(Continued)

(52) U.S. Cl.
CPC .............. *E04C 5/122* (2013.01); *B29C 73/24* (2013.01); *E04C 5/10* (2013.01); *E04C 5/12* (2013.01); *E04C 5/125* (2013.01); *E04G 21/12* (2013.01); *E04G 23/0218* (2013.01); *F16G 11/04* (2013.01)

(58) Field of Classification Search
CPC ... E04C 5/163; E04C 5/02; E04C 5/10; E04C 5/161; E04C 5/165; E04C 5/122; E04C 5/12; E04C 5/125; E04G 21/12; E04G 23/0218; B29C 73/24; F16B 7/182; F16G 11/04
See application file for complete search history.

(56) References Cited

U.S. PATENT DOCUMENTS

| | | | | |
|---|---|---|---|---|
| 4,318,256 A | * | 3/1982 | Boonman ............... | E04G 21/12 52/223.13 |
| 4,724,639 A | * | 2/1988 | Moser ..................... | E04C 5/122 52/223.13 |
| 5,749,185 A | | 5/1998 | Sorkin | |

(Continued)

FOREIGN PATENT DOCUMENTS

| | | |
|---|---|---|
| CH | 677245 A5 | 4/1991 |
| EP | 3305987 A1 | 4/2018 |

OTHER PUBLICATIONS

Extended European Search Report issued in EP App. No. 20175366.2 dated Oct. 22, 2020 (7 pages).

*Primary Examiner* — Jessie T Fonseca
(74) *Attorney, Agent, or Firm* — Locklar PLLC

(57) ABSTRACT

A sheathing repair assembly for a tension member of a post-tensioning tendon, the tension member including a strand and a sheathing layer is disclosed. The sheathing repair assembly includes a repair tube having first and second end portions and a first sealing assembly. The first sealing assembly includes a first nut having a first frustoconical surface and a first forcing element adapted to cooperate with the first frustoconical surface so as to compress the first end portion of the repair tube. The sheathing repair assembly also includes a second sealing assembly having a second nut having a second frustoconical surface and a second forcing element adapted to cooperate with the second frustoconical surface so as to compress the second end portion of the repair tube.

20 Claims, 9 Drawing Sheets

(51) Int. Cl.
*E04C 5/10* (2006.01)
*F16G 11/04* (2006.01)

(56) References Cited

U.S. PATENT DOCUMENTS

| | | | |
|---|---|---|---|
| 5,755,065 A | 5/1998 | Sorkin | |
| 5,770,286 A | 6/1998 | Sorkin | |
| 6,098,356 A | 8/2000 | Sorkin | |
| 6,151,850 A | 11/2000 | Sorkin | |
| 6,176,051 B1 | 1/2001 | Sorkin | |
| 6,381,912 B1 | 5/2002 | Sorkin | |
| 6,631,596 B1 | 10/2003 | Sorkin | |
| 6,761,002 B1 * | 7/2004 | Sorkin | E04C 5/12 403/374.1 |
| 6,817,148 B1 | 11/2004 | Sorkin | |
| 7,793,473 B2 | 9/2010 | Sorkin | |
| 7,797,894 B1 | 9/2010 | Sorkin | |
| 7,823,345 B1 | 11/2010 | Sorkin | |
| 7,841,061 B1 | 11/2010 | Sorkin | |
| 7,841,140 B1 | 11/2010 | Sorkin | |
| 7,856,774 B1 * | 12/2010 | Sorkin | E04C 5/122 52/223.13 |
| 7,950,196 B1 | 5/2011 | Sorkin | |
| 7,950,197 B1 | 5/2011 | Sorkin | |
| 7,963,078 B1 | 6/2011 | Sorkin | |
| 8,015,774 B1 | 9/2011 | Sorkin | |
| 8,065,845 B1 | 11/2011 | Sorkin | |
| 9,097,014 B1 | 8/2015 | Sorkin | |
| 10,113,313 B2 | 10/2018 | Sorkin | |
| 10,745,916 B2 * | 8/2020 | Hayes | E04C 5/122 |
| 2002/0157333 A1 * | 10/2002 | Kadotani | E04C 5/08 52/223.2 |
| 2010/0303540 A1 * | 12/2010 | Kim | E04C 5/165 403/305 |
| 2015/0330078 A1 * | 11/2015 | Sorkin | E04C 5/16 52/223.13 |
| 2016/0208490 A1 * | 7/2016 | Wilson | E04C 5/08 |
| 2016/0305140 A1 * | 10/2016 | Wilson | E04C 2/06 |
| 2018/0016789 A1 * | 1/2018 | Sorkin | E04C 5/165 |
| 2019/0234443 A1 * | 8/2019 | Man | F16B 7/182 |

* cited by examiner

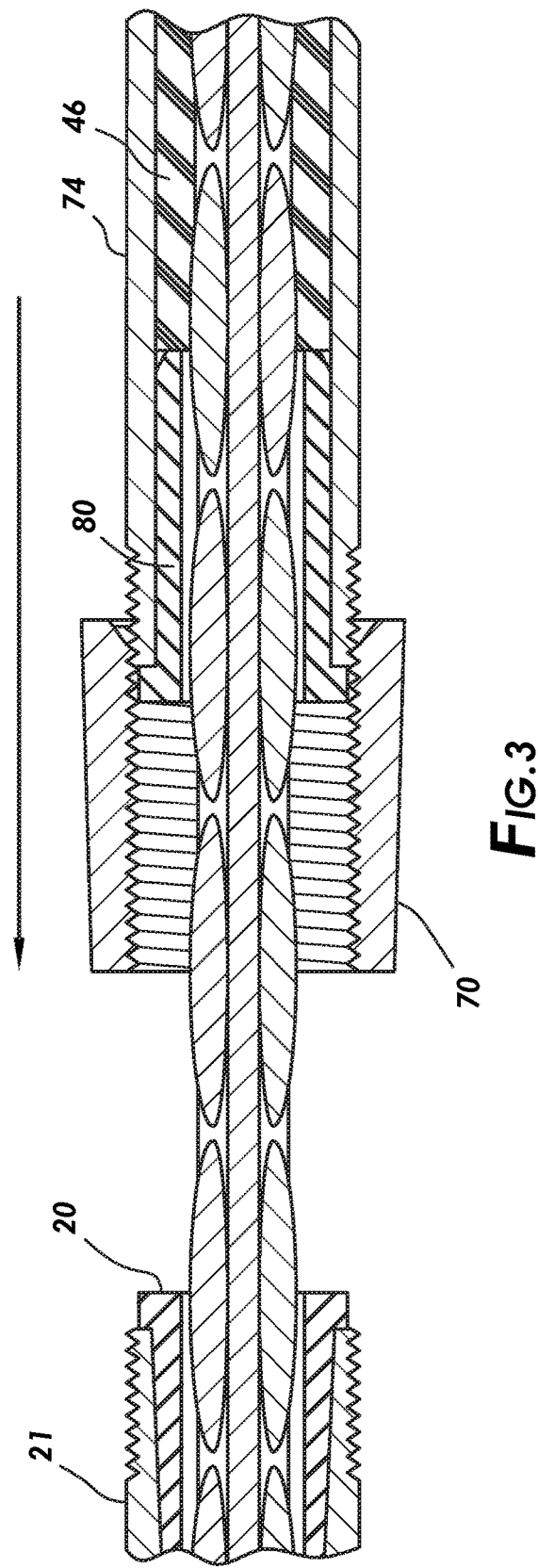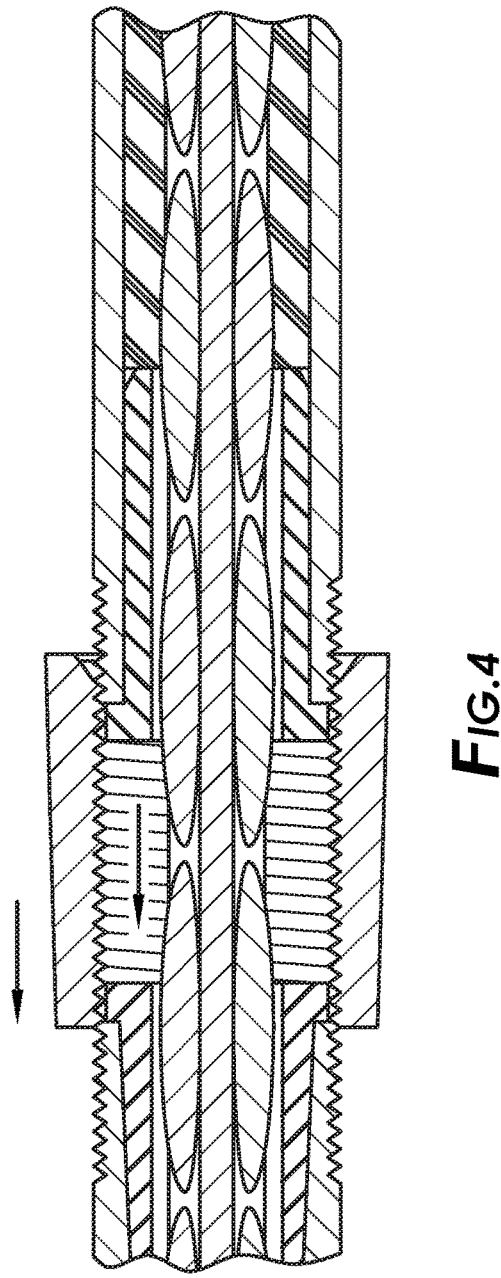

APPARATUS FOR REPAIRING A TENSION MEMBER

CROSS-REFERENCE TO RELATED U.S. APPLICATIONS

This application is a non-provisional application that claims priority from U.S. provisional application 62/853,602, filed May 28, 2019, provisional application 62/864,885, filed Jun. 21, 2019, and provisional application 62/930,686, filed Nov. 5, 2019, each of which is hereby incorporated by reference in its entirety.

TECHNICAL FIELD/FIELD OF THE DISCLOSURE

The present disclosure relates generally to an apparatus for use in post-tensioning concrete.

BACKGROUND OF THE DISCLOSURE

Many structures are built using concrete, including, for instance, buildings, parking structures, apartments, condominiums, hotels, mixed-use structures, casinos, hospitals, medical buildings, government buildings, research/academic institutions, industrial buildings, malls, bridges, pavement, tanks, reservoirs, silos, foundations, sports courts, and other structures.

The concrete may be poured into a concrete form. The concrete form may be a form or mold to give shape to the concrete as the concrete sets or hardens thus forming a concrete member.

Prestressed concrete is structural concrete in which internal stresses are introduced to reduce potential tensile stresses in the concrete resulting from applied loads; prestressing may be accomplished by post-tensioned prestressing or pre-tensioned prestressing. In post-tensioned prestressing, a post-tensioning tendon embedded in the concrete is tensioned after the concrete has attained a specified strength. A post-tensioning tendon may include for example and without limitation, anchorages, the tension member, and sheathes or ducts.

A post-tensioning tendon generally includes an anchorage at each end. The tension member is fixedly coupled to a fixed anchor positioned at one end of the post-tensioning tendon, sometimes referred to as the "fixed-end" or "dead end" anchor, and is stressed at the other anchor, sometimes referred to as the "stressing-end" or "live end" anchor.

The tension member may be constructed of a material that is suitable for post-tensioning, such as, for example, reinforcing steel or composite material in the form of single or multi-strand cable. A post-tensioning tension member is typically provided in a protective sheath. The sheath may be polymeric and may contain a protective fluid, such as grease, in addition to the tension member. The purpose of the sheath and protective fluid, if present, is to inhibit air, water, and other corrosive substances from contacting the tension member.

The tension member is stressed by pulling the tension member through the stressing anchor; when the pulling force is released, the anchors grip the tension member and retain the tension member in tension. In some instances, the anchors grip the tension member using wedges, so that the gripping force increases when the tension on the tension member increases.

SUMMARY

A sheathing repair assembly for a tension member of a post-tensioning tendon, the tension member including a strand and a sheathing layer is disclosed. The sheathing repair assembly includes a repair tube having first and second end portions and a first sealing assembly. The first sealing assembly includes a first nut having a first frustoconical surface and a first forcing element adapted to cooperate with the first frustoconical surface so as to compress the first end portion of the repair tube. The sheathing repair assembly also includes a second sealing assembly having a second nut having a second frustoconical surface and a second forcing element adapted to cooperate with the second frustoconical surface so as to compress the second end portion of the repair tube.

In some embodiments, the first forcing element may be a cap. The cap may include a cap extension and an anchor-engaging end adapted to engage a concrete anchor. At least one forcing element may be a split seal.

In other embodiments, the first nut may be a female nut, the first forcing element may be a barbed ferrule, and the assembly may further include a male nut configured to mechanically couple to the female nut so as to urge the barbed ferrule toward the first frustoconical surface. The sheathing repair assembly may further include a seal between the barbed ferrule and the female nut. The sheathing repair assembly may further include a washer between the seal and the male nut. Engagement of the male nut with the female nut may also urge the barbed ferrule into engagement with the sheathing layer.

The sheathing repair assembly may further include a long seal between the repair tube and the strand. The sheathing repair assembly may further include an inner tube between the long seal and the repair tube.

A method for repairing an unsheathed portion of a tension member, the tension member comprising a strand and a sheathing layer is disclosed. The method includes providing a sheathing repair assembly. The sheathing repair assembly includes a repair tube having first and second end portions and a first sealing assembly. The first sealing assembly includes a first nut having a first frustoconical surface and a first forcing element adapted to cooperate with the first frustoconical surface so as to compress the first end portion of the repair tube. The sheathing repair assembly also includes a second sealing assembly having a second nut having a second frustoconical surface and a second forcing element adapted to cooperate with the second frustoconical surface so as to compress the second end portion of the repair tube. The method also includes positioning the repair tube so as to enclose the unsheathed portion and positioning the first nut and the first forcing element adjacent to the first end portion. In addition, the method includes positioning the second nut and the second forcing element adjacent to the second end portion and compressing the first end portion of the repair tube between the first forcing element and the first frustoconical surface. The method also includes compressing the second end portion of the repair tube between the second forcing element and the second frustoconical surface.

In some embodiments, step a) may include providing a concrete anchor and the first forcing element may be a cap, the cap including a cap extension and an anchor-engaging end adapted to engage the concrete anchor, and the method may further include a step of mechanically coupling the anchor-engaging end to the concrete anchor. At least one forcing element may be a split seal.

In some embodiments, the first nut may be a female nut, the first forcing element may be a barbed ferrule, and the assembly may further include a male nut configured to mechanically couple to the female nut so as to urge the barbed ferrule toward the first frustoconical surface. Step d) may include mechanically coupling the male nut to the female nut. The method may also include placing a seal between the barbed ferrule and the female nut. The method may further include placing a washer between the seal and the male nut. Engagement of the male nut with the female nut may urge the barbed ferrule into engagement with the sheathing layer.

BRIEF DESCRIPTION OF THE FIGURES

FIGS. 3 and 4 are enlarged cross-sections illustrating operation of the anchor and cover system of FIG. 2.

DETAILED DESCRIPTION

Figure 1:
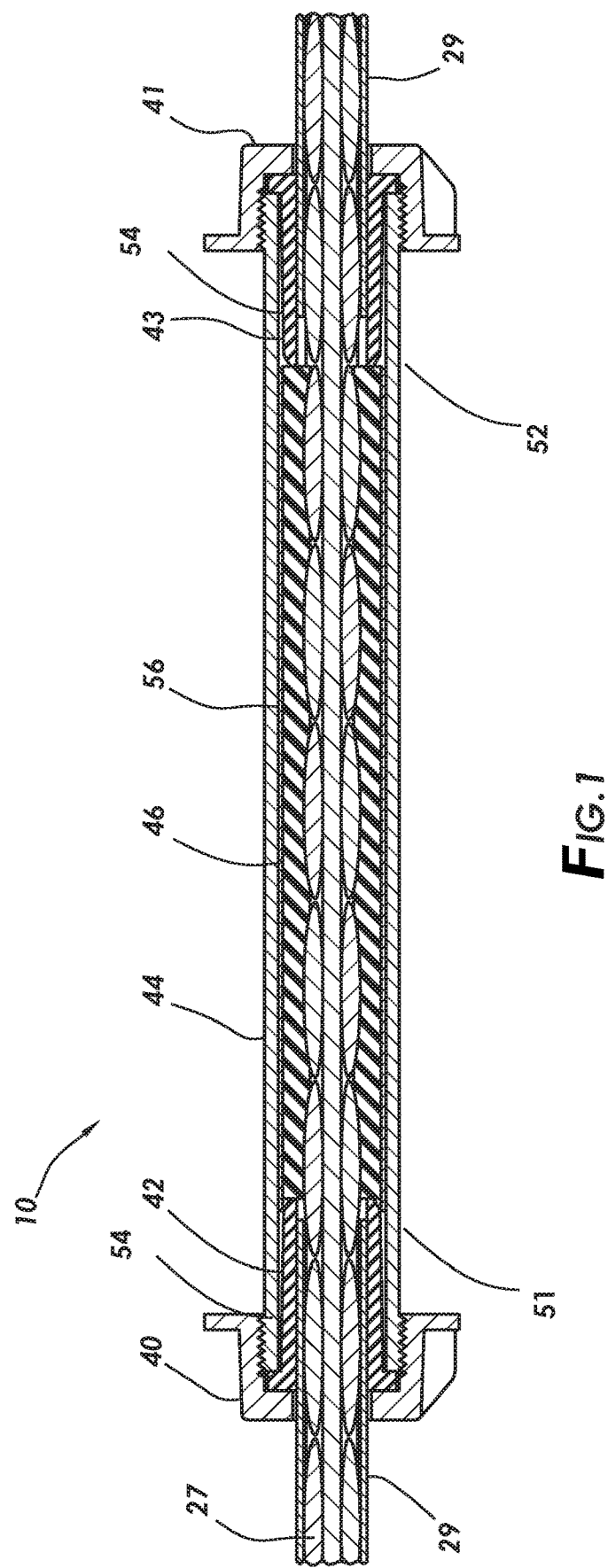
FIG. 1 is a cross-sectional view of a sheathing repair assembly consistent with at least one embodiment of the present disclosure.

Referring to FIG. 1, sheathing repair assembly 10 in accordance with some embodiments may include an outer tube 44 having first end portion 51 and second end portion 52, a tubular long seal 46, first and second seals 42, 43 positioned in first and second end portions 51, 52 of outer tube 44, respectively, and first and second nuts 40, 41 each retaining first and second seals 42, 43 first and second end portions 51, 52 of outer tube 44. Sheathing repair assembly 10 may be used to repair a tension member such as tension member 27 where sheathing 29 is damaged or discontinuous. In one embodiment, sheathing repair assembly 10 includes inner tube 56. In another embodiment, sheathing repair assembly 10 does not include inner tube 56.

The components of the sheathing repair assembly 10 may be fully or partially pre-assembled prior to delivery to the pour site or may be assembled at the pour site.

Outer tube 44 may be made of an elastomeric polymer. Outer tube 44 may be positioned over tension member 27 by sliding outer tube 44 from an end of tension member 27 to a location on tension member 27. In some embodiments, each end portion 51, 52 of outer tube 44 may include engagement feature 54, such as threads, bayonet tabs or a groove or ridge, to facilitate engagement with first and second nuts 40, 41. In some embodiments, outer tube 44 may be provided without engagement feature 54. In some embodiments, the inside diameter of outer tube 44 may be greater than the outside diameter of tubular long seal 46. In some embodiments, the inside diameter of outer tube 44 may be less than the outside diameter of tubular long seal 46. In some embodiments, the inside diameter of outer tube 44 may be substantially the same as the outside diameter of tubular long seal 46.

Tubular long seal 46 may be made of elastomeric polymer and may include a compressible elastomer. Tubular long seal 46 may be split longitudinally. Tubular long seal 46 may be applied from the side of tension member 27 by passing the tension member through the slit, so that access to the end of tension member 27 is not required. Tubular long seal 46 may be sized to receive tension member 27 therein. In some embodiments, the inside diameter of tubular long seal 46 may be less than the outside diameter of tension member 27 so that the inner surface of tubular long seal 46 conforms to the outer surface of tension member 27. In some embodiments, the inside diameter of tubular long seal 46 may be substantially the same as the outside diameter of tension member 27.

Optional inner tube 56 may be made of an elastomeric or non-elastomeric polymer, or a metal. In one embodiment, inner tube 56 may have a longitudinal split and may be applied from the side of the tension member. In another embodiment, inner tube 56 may have no split and may be positioned on the tension member by sliding inner tube 56 from the end of the tension member to a desired position. At least one end portion of inner tube 56 may include a hole, tab, or other feature to facilitate movement of inner tube 56. Inner tube 56 may be applied to the outside of tubular long seal 46 after tubular long seal 46 is applied to the tension member 27 and before outer tube 44 is applied to the outside of tubular long seal 46. Inner tube 56 may facilitate the passage of tubular long seal 46 into outer tube 44. Inner tube 56 may protect tubular long seal 46 until outer tube 44 is applied to the outside of tubular long seal 46. The inside diameter of inner tube 56 may be substantially the same as or less than the outside diameter of tubular long seal 46. The outside diameter of inner tube 56 may be substantially the same as the inside diameter of outer tube 44. The outside diameter of inner tube 56 may be less than the inside diameter of outer tube 44.

First and second seals 42, 43 may be made of elastomeric polymer and may be split longitudinally. First and second seals 42, 43 may be applied from the side of tension member 27 by passing tension member 27 through the slit, so that access to the end of tension member 27 is not required.

Each of first and second nuts 40, 41 may mechanically engage outer tube 44 at engagement feature 54, if present, and may include corresponding internal threads, bayonet tabs or a ridge or groove. In some embodiments, first and second nuts 40, 41 may be self-tapping nuts that create threads when threaded onto outer tube 44. In some embodiments, each of first and second nuts 40, 41 is a threaded or self-tapping nut engaged with outer tube 44.

When assembled, sheathing repair assembly 10 defines a longitudinal passage that is adapted to receive tension member 27 and to sealingly engage the outer surface thereof. The presence of sheathing repair assembly 10 on tension member 27 seals the portion of tension member 27 that is within the assembly, i.e. between first and second nuts 40, 41. In each embodiment and each method described herein, repairing a tension member sheath may include re-sheathing to prevent the ingress of fluid into tension member 27.

Figure 2:
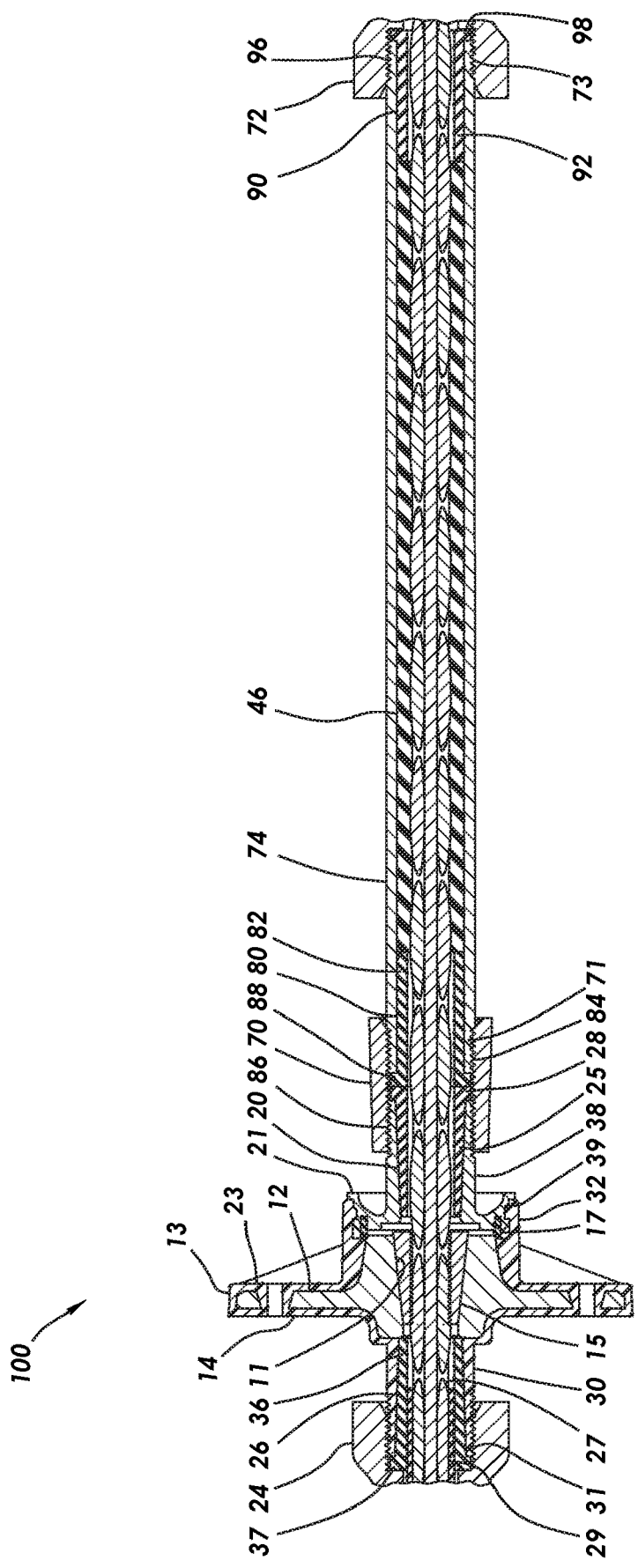
FIG. 2 is a cross-sectional view of an anchor and cover system consistent with at least one embodiment of the present disclosure.

Referring now to FIG. 2, in another embodiment, intermediate anchor and cover assembly 100 may include rear nut 24, anchor body 12, encapsulation 13, cap 21, coupler 70, cover 74, and remote nut 72. As illustrated, intermediate anchor and cover assembly 100 may be adapted to be received on tension member 27. Tension member 27 may include sheathing 29. A portion of sheathing 29 may be damaged or absent from the portion of the tension member 27 that passes through intermediate anchor and cover assembly 100.

Anchor body 12 may be encapsulated in encapsulation 13. Anchor body 12 may have an anchor body bore extending therethrough and adapted to receive a tension member such as tension member 27. Anchor body 12 may include frustoconical inner surface 11 on which plurality of wedges 15 may seat when tensioning tension member 27 extending through anchor body 12.

Encapsulation 13 may have rear surface 14 and front surface 23. Rear surface 14 may include rear encapsulation extension 30 extending outwardly therefrom. Rear encapsulation extension 30 may include an inner bore coaxially aligned with the anchor body bore. Rear encapsulation extension 30 may be tubular. Rear encapsulation extension 30 may or may not be tapered and may or may not include external engagement feature 31, such as threads or bayonet tabs or a groove or ridge for securing a snap-fit. The inside diameter of rear encapsulation extension 30 may be greater than the outside diameter of tension member 27 or sheathing 29 so as to define an annular space therewith.

Rear seal 26 may sealingly engage rear encapsulation extension 30. Rear seal 26 may be a split seal having a longitudinal split that enables rear seal 26 to be applied to a tension member from the side, i.e. without requiring access to the tension member end. Rear seal 26 may be made of metal or of a soft elastomer, rubber, silicone, or other suitably deformable sealing material. Rear seal 26 may be sized to fit in the annular space between rear encapsulation extension 30 and tension member 27. In some embodiments, rear seal 26 may have rear seal body 36 and rear seal head 37. The outside diameter of rear seal body 36 may be the same as or smaller than the inside diameter of rear encapsulation extension 30 so that rear seal 26 may be applied to the side of tension member 27 and then slid along tension member 27 and into the annular space between rear encapsulation extension 30 and tension member 27.

Rear nut 24 may be provided to retain rear seal 26. Rear nut 24 may engage rear encapsulation extension 30 at external engagement feature 31, if present, and may include corresponding internal threads, bayonet tabs or a ridge or groove. In some embodiments, rear encapsulation extension 30 may be provided without an engagement feature and rear nut 24 may be a self-tapping nut that creates threads when it is threaded onto rear encapsulation extension 30. Rear seal 26 may be sized to have a volume greater than the volume of the annular space between rear encapsulation extension 30 and tension member 27 so that when rear nut 24 is fully engaged on rear encapsulation extension 30, rear seal 26 is compressed into a volume that is smaller than it would otherwise occupy. Rear seal head 37 may be compressed in an axial direction between rear nut 24 and rear encapsulation extension 30. Rear seal 26 may be formed of a deformable material that conforms to the shape of the annular space so that when rear nut 24 is fully engaged on rear encapsulation extension 30 there are no unfilled voids between anchor body 12 and rear nut 24.

Front surface 23 of encapsulation 13 may include front encapsulation extension 32 extending outwardly therefrom. Front encapsulation extension 32 may be annular and may include an inner bore coaxially aligned with the anchor body bore. Front encapsulation extension 32 may or may not include internal threads or bayonet tabs or a groove or ridge for securing a snap-fit.

Cap 21 may releasably engage front encapsulation extension 32 by, for example, friction fit, threads, or bayonet connection. Cap 21 may include engagement interface 39, cap extension 38, and inner bore that may align with the anchor body bore. Engagement interface 39 may releasably engage front encapsulation extension 32 at the internal threads or bayonet tabs or groove or ridge thereon, if present, and may include corresponding external threads, bayonet tabs or a ridge or groove.

Cap seal 17 may be disposed in an annular groove formed in cap 21 such that cap seal 17 sealingly engages at least one of anchor body 12 or encapsulation 13 when cap 21 is fully engaged on front encapsulation extension 32. Cap seal 17 may be annular or toroidal, and may be, for example, an O-ring.

Cap extension 38 may be tubular. The inner surface of cap extension 38 may be tapered and the outer surface of cap extension 38 may include external engagement feature 86, such as threads or bayonet tabs or a groove or ridge for securing a snap-fit. The inside diameter of cap extension 38 may be greater than the outside diameter of tension member 27 so as to define an annular space therewith.

Front seal 20 may sealingly engage cap extension 38. Front seal 20 may be a split seal having a longitudinal split that enables front seal 20 to be applied to a tension member 27 from the side, i.e. without requiring access to the tension member end. Front seal 20 may be made of metal or of a soft elastomer, rubber, silicone, or other suitably deformable sealing material. Front seal 20 may be sized to fit in the annular space between cap extension 38 and tension member 27. Front seal 20 may have body 25 and head 28. The outside diameter of body 25 may be the same as or smaller than the inside diameter of cap extension 38 so that front seal 20 may be applied to the side of tension member 27 and then slid along the tension member and into the annular space between cap extension 38 and tension member 27.

Coupler 70 may be configured to be rotated about tension member 27. Coupler 70 may mechanically couple to cap extension 38. Coupler 70 may retain front seal 20. Alternatively or in addition, coupler 70 may compress front seal 20. In some embodiments, coupler 70 may engage cap extension 38 at external engagement feature 86, if present, and may include corresponding internal threads, bayonet tabs or a ridge or groove. In some embodiments, cap extension 38 may be provided without an engagement feature and coupler 70 may be a self-tapping nut that creates threads as it is threaded onto cap extension 38.

In addition to engaging cap 21, coupler 70 may mechanically couple to cover 74. Cover 74 may be a split tube, i.e. able to be applied from the side of tension member 27. Cover 74 may fit around a tubular long seal 46, which may extend along a portion of the tension member. Cover 74 may be longer than tubular long seal 46, so that the ends of cover 74 extend beyond the ends of tubular long seal 46, leaving an annular space between each end portion of cover 74 and tension member 27. While cover 74 may be essentially symmetric, when applied as part of intermediate anchor and cover assembly 100, cover 74 will have proximal end portion 71 and remote end portion 73.

Proximal end portion 71 and remote end portion 73 may each include external engagement features 84, 96, respectively, such as threads, bayonet tabs, grooves, or ridges, to facilitate engagement with coupler 70 and remote nut 72, respectively. In some embodiments, one or both ends 51, 52 of outer tube 44 may be provided without an engagement feature and one or both of coupler 70 and remote nut 72 may include self-tapping threads.

In some embodiments, proximal end portion 71 of cover 74 may include external threads that are reverse threads relative to external threads on cap extension 38 so that rotation of coupler 70 in one direction about tension member 27 will draw cover 74 and cap extension 38 together and rotation of coupler 70 in the other direction about tension member 27 will push cover 74 and cap extension 38 apart.

A proximal seal 80 and a remote seal 90 may be positioned in the annular spaces between tension member 27 and proximal end portion 71 and remote end portion 73, respectively. Proximal seal 80 may include a head 88 and a body 82. Remote seal 90 may include head 98 and body 92.

In some embodiments, proximal seal 80 may sealingly engage proximal end portion 71 and remote seal 90 may sealingly engage remote end portion 73. Proximal seal 80 and remote seal 90 may each be a split seal having a longitudinal split that enables the seal to be applied to a tension member from the side, i.e. without requiring access to the tension member end. Proximal seal 80 and remote seal 90 may each be made of metal or of a soft elastomer, rubber, silicone, or other suitably deformable sealing material. The outside diameter of each proximal seal 80 and remote seal 90 may be the same as or smaller than the inside diameter of cover 74 so that each seal may be applied to the side of tension member 27 and then slid along the tension member and into the respective annular space between cover 74 and tension member 27.

Like rear seal 26, each seal, 20, 80, 90 (front, proximate, and remote) may be sized to have a volume greater than the volume of the annular space into which it fits so that assembly of intermediate anchor and cover assembly 100 causes each seal to be compressed into a volume that is smaller than it would otherwise occupy. Each seal 20, 80, 90 may be formed of a deformable material such that when intermediate anchor and cover assembly 100 is fully engaged as described below, there are no substantially unfilled voids between cap 21, coupler 70, proximal end portion 71 of cover 74 and tension member 27 or between remote end portion 73 of cover 74, remote nut 72, and tension member 27.

Head 28 of front seal 20 and head 88 of proximal seal 80 may both be compressed in an axial direction between the ends of cap extension 38 and tubular long seal 46. Head 98 of remote seal 90 may be compressed in an axial direction between remote nut 72 and remote end portion 73 of cover 74.

The components of the intermediate anchor and cover assembly 100 may be fully or partially pre-assembled prior to delivery to the pour site or may be assembled at the pour site.

Operation

In some embodiments, rear nut 24, anchor body 12 (including encapsulation 13, if present), cap 21, coupler 70, cover 74, and remote nut 72 may be applied to tension member 27 at an end of the tension member 27 and slid along the tension member to the desired location.

Some or all of the components of intermediate anchor and cover assembly 100 may be pre-assembled prior to delivery to the pour site or may be assembled at the pour site. For example, components of intermediate anchor and cover assembly 100 that are adapted to be mechanically coupled, such as rear nut 24 and rear encapsulation extension 30, may be provided in either a coupled or decoupled state. Seals 26, 20, 80, and 90 may be but are not necessarily included in the pre-assembly. If included, seals 26, 20, 80, and 90 may be removed before initiation of installation steps.

Because intermediate anchor and cover assembly 100 may be used at the interface between a first concrete pour and a second, adjacent concrete pour, portions of intermediate anchor and cover assembly 100 may be installed before the first pour and portions of intermediate anchor and cover assembly 100 may be installed between the first and second pours. Tension member 27 extends through both concrete pours. Anchor body 12 (including encapsulation 13, if present) may be embedded in the first pour and a front encapsulation extension 32 may be shielded by a pocket former (not shown), a removable cap such as cap 21, or the like so as to be exposed between the first and second pours, allowing for connection of cap 21 and the remainder of intermediate anchor and cover assembly 100.

In some embodiments, rear nut 24, anchor body 12 (including encapsulation 13, if present), and cap 21 may be positioned, such as at a concrete form that will contain the first pour. Anchor body 12 may be affixed to the concrete form with, for example, fasteners that may be placed through holes in encapsulation 13. If coupled to rear encapsulation extension 30, rear nut 24 may be decoupled therefrom. Rear seal 26 may be applied and slid along tension member 27 and into the space between rear encapsulation extension 30 and tension member 27. Rear nut 24 may then be recoupled to rear encapsulation extension 30, thereby compressing at least a portion of rear seal 26 and sealing the rear of the intermediate anchor.

The first concrete pour may then be made. Once the first concrete pour has cured sufficiently, the concrete form may be removed. Cap 21 may be decoupled from anchor body 12 or encapsulation 13 and slid along tension member 27 so as to allow access to the anchor body bore. More specifically, access to inner surface 11 is provided so that wedges 15 may be seated thereon prior to tensioning the tension member 27. Once wedges 15 are seated and tension member 27 has been tensioned, cap 21 may be recoupled to the anchor body 12 or encapsulation 13. The portion of tension member 27 extending outwardly from anchor body 12 through cap 21 may or may not be sheathed or, if sheathed, may include a section of damaged sheathing.

Referring now to FIGS. 3 and 4, with cap 21 recoupled to the anchor, front seal 20 may be slid into the space between cap 21 and tension member 27. At another point along tension member 27, proximal seal 80 may be slid into the space between cover 74 and tension member 27. Cover 74, proximal seal 80 and coupler 70 may be slid along tension member 27 as indicated by the arrow in FIG. 3 and positioned such that coupler 70 is between and adjacent to the end of cap extension 38 and the proximal end portion 71 of cover 74. The internal engagement mechanism of coupler 70 is positioned to engage the external engagement mechanisms of cap 21 and cover 74. In some embodiments, because proximal end portion 71 is reverse-threaded, rotation of coupler 70 may draw cover 74 toward cap 21, as indicated by the arrows in FIG. 4. Coupler 70 may be tightened to a desired torque or until seal heads 28, 88 are compressed to a desired degree, as illustrated in FIG. 2. Thus, coupler 70 may mechanically couple to cap extension 38 at a first threaded interface and mechanically couple to proximal end portion 71 at a second threaded interface, where the second threaded interface is reversed with respect to the first threaded interface.

Tubular long seal 46 may be applied with the aforementioned components or may be applied separately from the side of the tension member at a desired location or slid along the tension member to a desired location. In some embodiments, tubular long seal 46 may be long enough to fully cover and, optionally, extend beyond an unsheathed portion of tension member 27 or, if a portion of sheathing 29 has been removed, tubular long seal 46 may be positioned between the ends of the sheathing 29. With tubular long seal 46 in place between tension member 27 and cover 74, remote seal 90 may be inserted between tension member 27 and remote end portion 73 of cover 74 and remote nut 72 can be tightened into engagement with remote end portion 73 to a desired torque or so as to compress remote seal 90 to a desired degree.

An inner tube 56 may be applied to the outside of tubular long seal 46 after tubular long seal 46 is applied to the tension member 27 and before or after tubular long seal 46 is positioned at the unsheathed portion thereof. Inner tube 56 may already be present on tension member 27 or may be applied from the end of tension member 27.

With rear nut 24, coupler 70 and remote nut 72 each, intermediate anchor and cover assembly 100 may be considered fully assembled. In some embodiments, in the fully assembled state, intermediate anchor and cover assembly 100 may include no internal voids. In some embodiments, in the fully assembled state, intermediate anchor and cover assembly 100 may provide a fluid-tight seal along the entire portion of tension member 27 that is enclosed therein.

When assembled, intermediate anchor and cover assembly 100 defines a longitudinal passage that is adapted to receive a tension member and to sealingly engage the outer surface thereof. The presence of the intermediate anchor and cover assembly 100 on tension member 27 seals the portion of the tension member that is within the assembly, i.e. between each adjacent pair of seals. Thus, portions of tension member 27 for which sheathing 29 may be damaged or lacking, along with anchor body 12 and wedges 15, can be sealed against fluid intrusion. In each embodiment and each method described herein, repairing a tension member may include re-sheathing the portion of the tension member that is within intermediate anchor and cover assembly 100 to prevent the ingress of fluid into the tension member 27.

Sealing Assemblies

Figure 5:
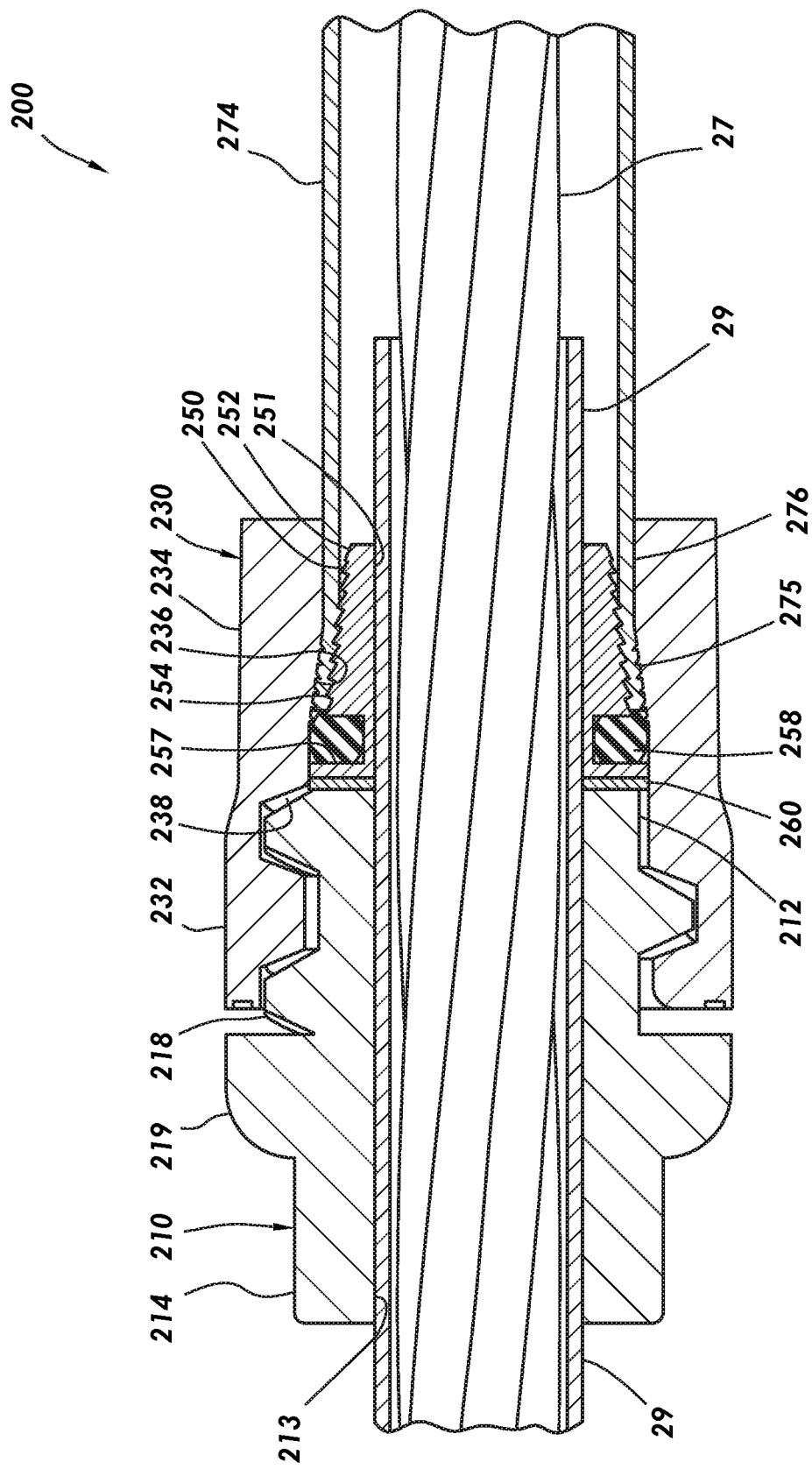
FIG. 5 is an enlarged cross-section illustrating another embodiment of the present disclosure.

In certain embodiments, a sheathing repair assembly may include two sealing assemblies 200. As shown in FIG. 5, sealing assembly 200 is shown in combination with a tension member 27. Part of tension member 27 is enclosed in sheathing 29. Sealing assembly 200 may include male nut 210, female nut 230, and forcing element 250, and may be provided in conjunction with repair tube 274. In some embodiments, sealing assembly 200 may also include proximal seal 80 as described above.

Figure 6:
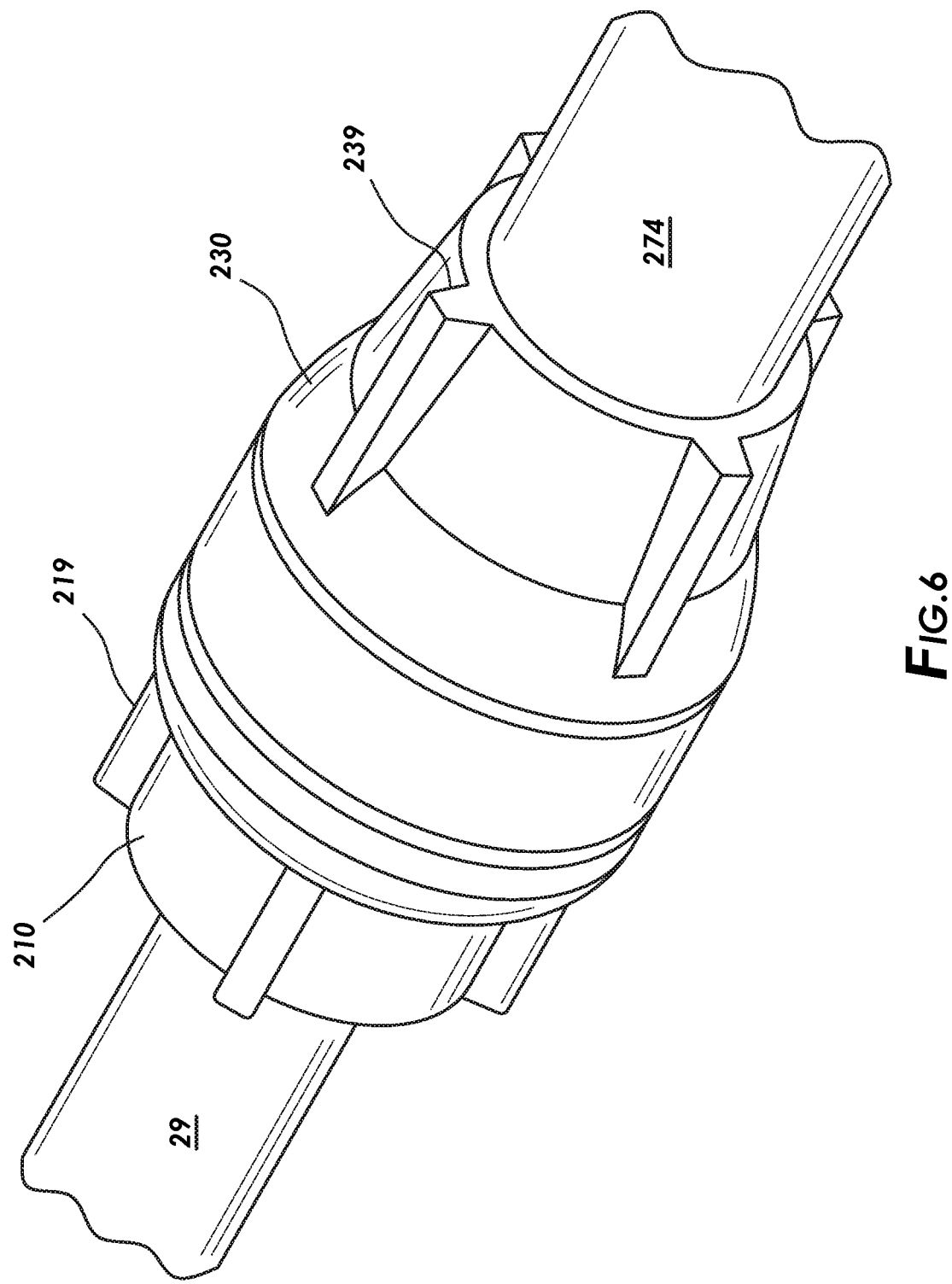
FIG. 6 is an isometric view of a connection assembly consistent with at least one embodiment of the present disclosure.

Male nut 210 has first end portion 212, second end portion 214 and central bore 213 therethrough. The outer surface of first end portion 212 includes at least one male thread 218. As shown in FIG. 6, the outside surface of male nut 210 may include one or more radial tabs 219 to facilitate rotation of male nut 210.

Female nut 230 has first end portion 232 and second end portion 234. The inner surface of first end portion 232 includes at least one female thread 238. Female thread 238 corresponds to and is adapted to engage male thread 218 so as to mechanically couple female nut 230 to male nut 210. In some embodiments, threads 218, 238 may be configured so as to couple nuts 210, 230 with one relative rotation or less. In some embodiments, threads 218, 238 may be replaced with, for example and without limitation, a bayonet connector, plastically deformable tabs, or a friction fit.

The inner surface of second end portion 234 includes a frustoconical inner surface that defines a forcing cone 236. The diameter of forcing cone 236 diminishes in the direction away from first end portion 232. Referring briefly to FIG. 6, the outside of female nut 230 may include one or more radial tabs 239 to facilitate rotation.

Forcing element 250 is adapted to serve as an expansion element, whereby insertion of forcing element 250 to an end of repair tube 274 causes radial expansion thereof. Forcing element 250 may be a barbed ferrule may have a frustoconical outer surface 252 and central bore 251 corresponding to central bore 213 of male nut 210. Outer surface 252 may be smooth or may include a friction device 254 on its outer surface 252. Friction device 254 may include, for example and without limitation, barbs, grooves or a roughened surface. In some embodiments, outer surface 252 of forcing element 250 may also include an optional circumferential groove 257. Groove 257 may be closer to the large end of forcing element 250 and may be adapted to receive seal 258. Seal 258 may be an O-ring. Seal 258 may be made of polymer or metal or any suitable material.

In some embodiments washer 260 may be positioned between forcing element 250 and first end portion 212 of male nut 210. In some embodiments, a portion of forcing element 250 is between washer 260 and seal 258; in other embodiments, forcing element 250 is configured such that washer 260 is adjacent to seal 258. Washer 260, if present, facilitates rotation, including rotation of male nut 210 relative to forcing element 250. In some embodiments, female nut 230, forcing element 250, washer 260, and seal 258 may be provided as a preassembled unit, or cartridge. Washer 260 may be made of polymer or metal or any suitable material.

In some embodiments, at least one end of repair tube 274 may include expansion portion 275. Expansion portion 275 may optionally include one or more of the following features: a tapered wall thickness, a flared wall diameter, longitudinal slots or grooves, and one or more internal or external friction devices. Before insertion of forcing element 250, the diameter of expansion portion 275 may be the same as or greater than the diameter of the rest of repair tube 274.

Repair tube 274 may include sealing assembly 200 at each end 276. In such instances, repair tube 274 may include expansion portion 275 at each end 276. A repair assembly may include repair tube 274, and two sealing assemblies 200 that each include male nut 210, female nut 230, and forcing element 250.

According to some embodiments, when it is desired to enclose a defect in a sheathing layer on a tension member 27, a repair assembly may be positioned at the desired location along tension member 27. For example, a repair assembly may be positioned such that the two sealing assemblies 200 are positioned on tension member 27 with the defect between the two sealing assemblies 200 and the repair tube 274 spanning the defect. Each sealing assembly 200 may be actuated by inserting the narrow end of forcing element 250 into an end of repair tube 274. In certain embodiments, where female nut 230, forcing element 250, washer 260, and seal 258 are provided as a preassembled unit, the preassembled unit may be slid along the outside of tension member 27 and into engagement with repair tube 274. Insertion of forcing element 250 into end of repair tube 274 may expand the end of repair tube 274 radially outward. Male nut 210 may then be coupled to female nut 230 by engaging threads 218, 238. Sealing assembly 200 may be configured such that when threads 218, 238 are fully engaged, the end of repair tube 274 is compressed between forcing cone 236 and the outer surface 252 of forcing element 250. If a seal 258 is present, engagement of threads 218, 238 may also compress seal 258.

Figure 7:
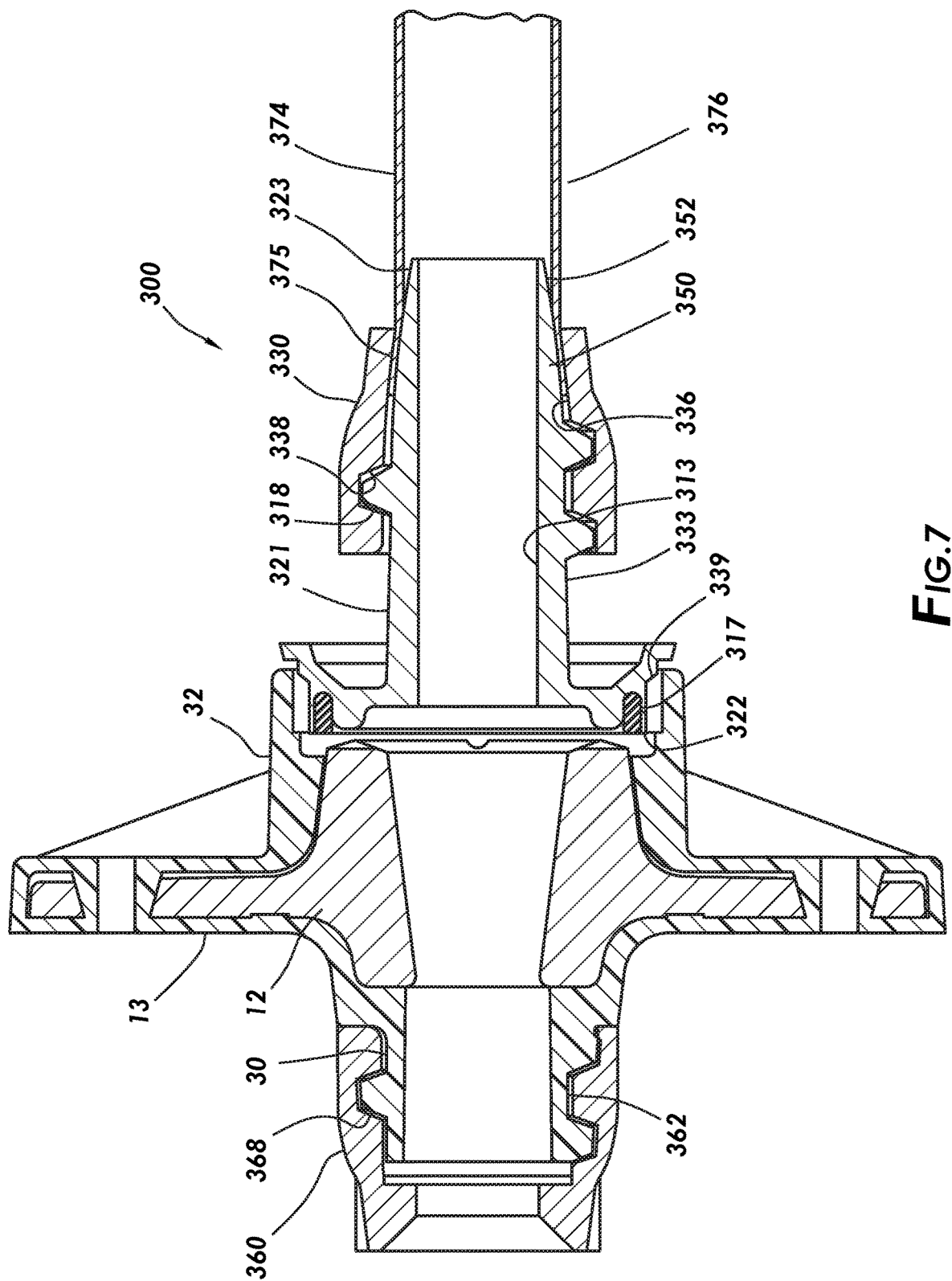
FIG. 7 is an enlarged cross-section illustrating a connection assembly consistent with another embodiment of the present disclosure.

In certain embodiments, a sheathing repair assembly may include two sealing assemblies 300. FIG. 7 depicts sealing assembly 300, which is adapted for use with an anchor such as an intermediate post-tensioning concrete anchor. Sealing assembly 300 may include female nut 330, repair tube 374, and cap 321. Cap 321 may have anchor-engaging end 322 including engagement interface 339, outwardly extending cap extension 333, and sealing end 323. As described above with respect to FIG. 2, an intermediate post-tensioning concrete anchor may include anchor body 12 having encapsulation 13 and front encapsulation extension 32. As described above with respect to FIG. 5, one or both ends 376 of repair tube 374 may include expansion portion 375.

Anchor-engaging end 322 of cap 321 may releasably engage front encapsulation extension 32 by any suitable means including but not limited to friction fit, threads, or bayonet connection. Engagement interface 339 may releasably engage front encapsulation extension 32 at the internal threads or bayonet tabs or groove or ridge thereon, if present, and may include corresponding external threads, bayonet tabs or a ridge or groove. A cap seal 317 may be disposed in an annular groove formed in cap 321 such that cap seal 317 sealingly engages at least one of anchor body 12 or encapsulation 13 when cap 21 is coupled to front encapsulation extension 32. Cap seal 317 may be annular or toroidal, and may be, for example, an O-ring.

Cap extension 333 may be generally tubular and may be adapted to serve as a forcing element. The inner surface of cap extension 333 may include a central bore 313. The portion of cap extension 333 adjacent to sealing end 323 may include a wedging portion 350 having a frustoconical outer surface 352. Frustoconical outer surface 352 may include a friction device, which may include, for example, barbs, grooves or a roughened surface. Frustoconical outer surface 352 may be configured such that frustoconical outer surface 352 may be inserted into an end of repair tube 274 so as to cause a partial radial expansion thereof.

The outer surface of cap extension 333 may also include an external engagement feature 318 between wedging portion 350 and anchor-engaging end 322. In the illustrated embodiment, engagement feature 318 includes threads, but in other embodiments engagement feature 318 may include, for example, a bayonet coupling or a groove or ridge for securing a snap-fit.

Female nut 330 may include at least one female thread 338. Female thread 338 may correspond to and be adapted to engage engagement feature 318, such as a male thread so as to mechanically couple female nut 330 to cap 321. In some embodiments, threads 318, 338 may be configured so as to couple female nut 330 to cap 321 with one relative rotation or less. In some embodiments, threads 218, 238 may be replaced with, for example, a bayonet connector, plastically deformable tabs, or a friction fit.

Female nut 330 may also include a frustoconical inner surface that defines forcing cone 336. Forcing cone 336 may be configured to cooperate with frustoconical outer surface 352 of cap 321 so as to compress an end of repair tube 374 when female nut 330 is coupled to cap 321. In some embodiments, the outside of female nut 330 may include one or more radial tabs) to facilitate rotation of female nut 330.

Second female nut 360 may be adapted to mechanically couple to rear encapsulation extension 30 of an anchor. Female nut 360 may be provided with an internal coupling feature 362 and rear encapsulation extension 30 may be provided with a corresponding external coupling feature 368. In the illustrated embodiment, coupling features 362, 368 are shown as threads, but coupling features 362, 368 could be, for example, a bayonet coupling or a groove or ridge for securing a snap-fit. In some embodiments, coupling features 362, 368 may be configured so as to couple second female nut 360 to rear encapsulation extension 30 with one relative rotation or less. In some embodiments, a longitudinally split seal that enables the seal to be applied to a tension member from the side in the manner described above with respect to proximal seal 80 and remote seal 90 may be included between female nut 360 and rear encapsulation extension 30.

Figure 8:
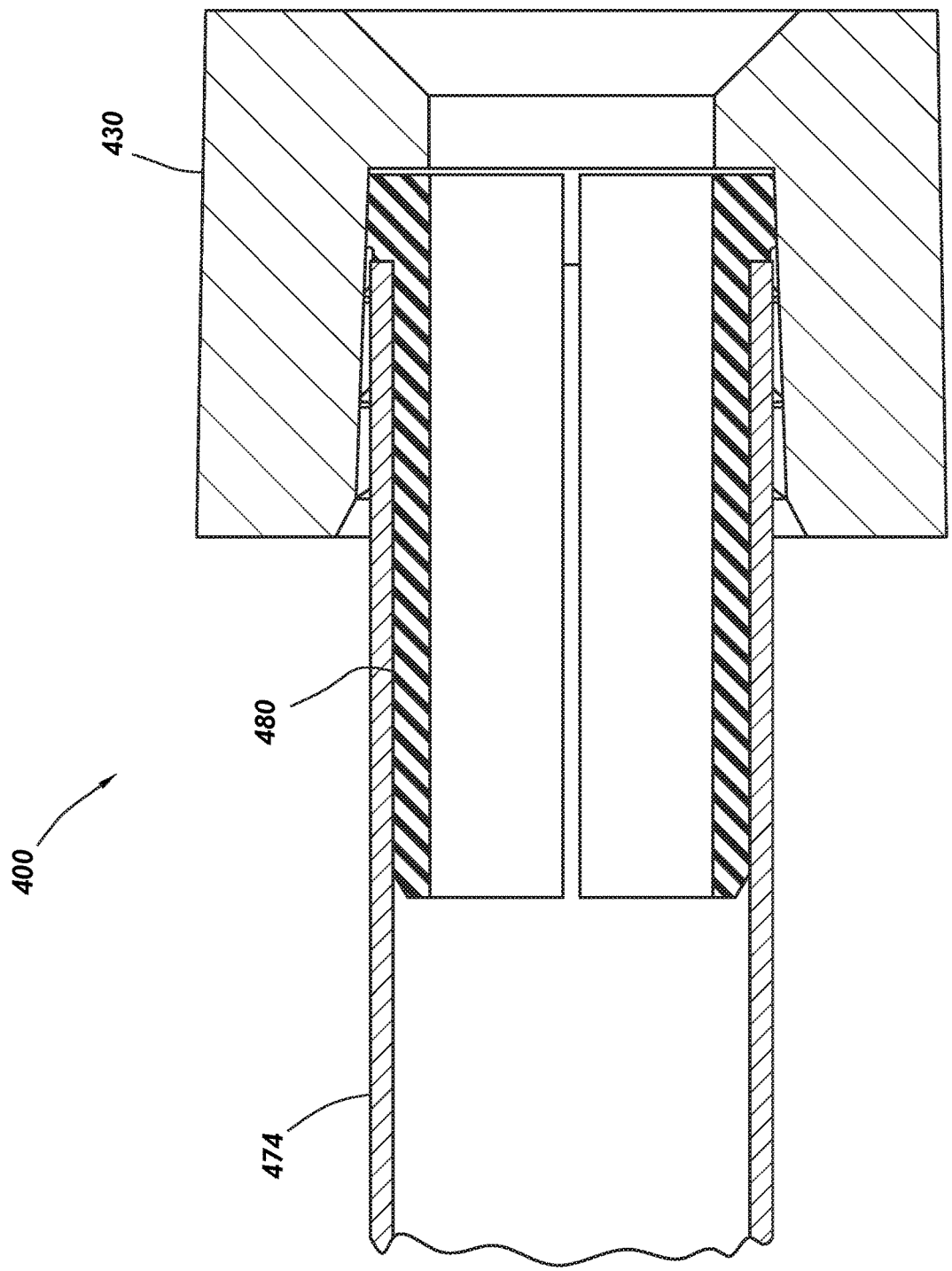
FIG. 8 is an enlarged cross-section illustrating a connection assembly consistent with another embodiment of the present disclosure.

In certain embodiments, a sheathing repair assembly may include two sealing devices 400. FIG. 8 depicts sealing devices 400 that includes female nut 430, forcing element 480, and repair tube 474. Female nut 430 may be a self-tapping nut that is adapted to create a sealed, threaded coupling with the outside of repair tube 474. Forcing element 480 may be a split seal and may be adapted to serve as a forcing element. Forcing element 480 may have a tapered outer surface that cooperates with an inner surface of female nut 430 to compress an end of repair tube 474 therebetween when female nut 430 is coupled to repair tube 474.

Figure 9:
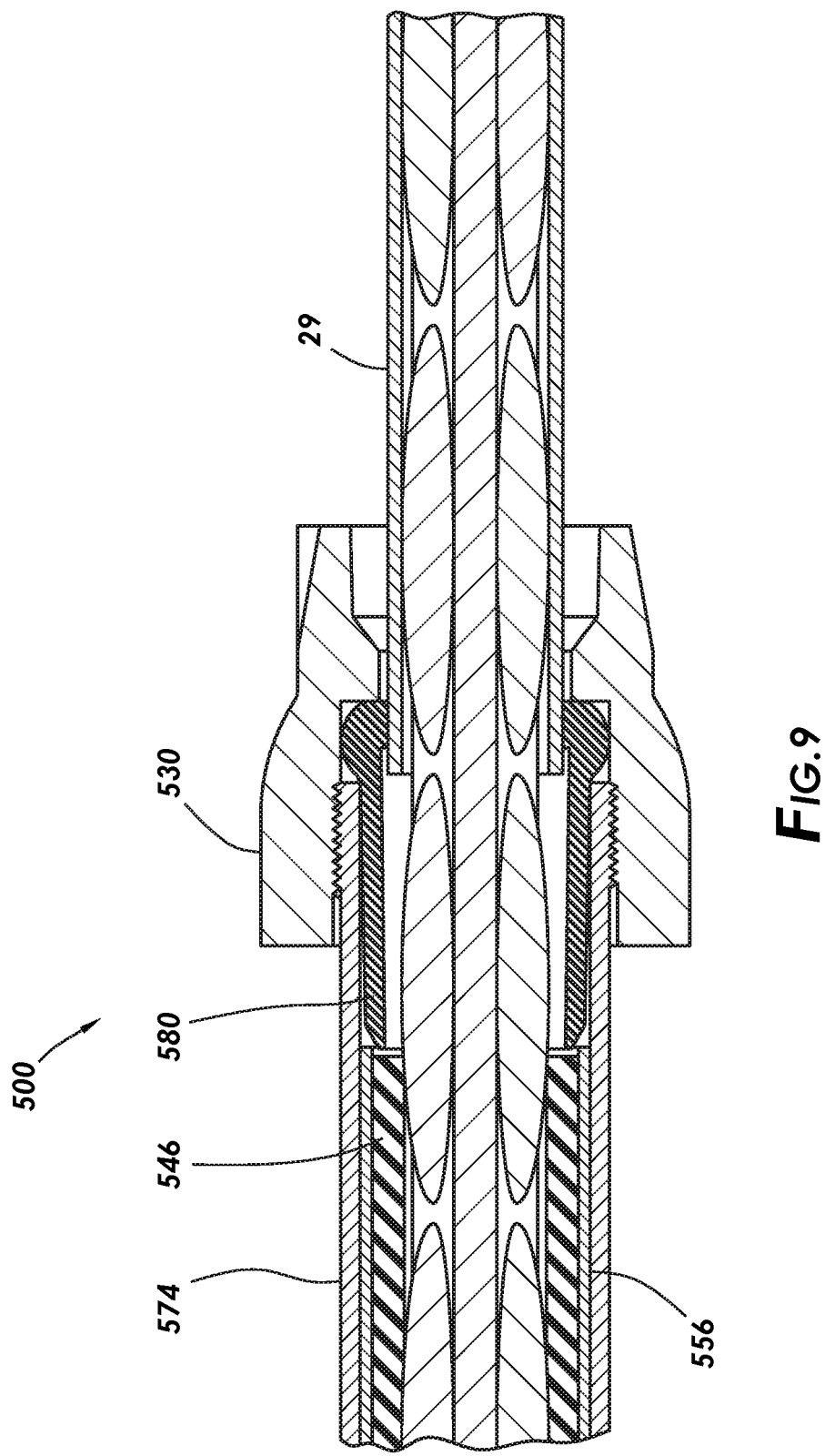
FIG. 9 is an enlarged cross-section illustrating a connection assembly consistent with another embodiment of the present disclosure.

FIG. 9 depicts sealing device 500 that includes female nut 530, split seal 580, tubular long seal 546, optional inner tube 556, and repair tube 574. Female nut 530 may be a self-tapping nut that is adapted to create a sealed, threaded coupling with the outside of repair tube 574. Split seal 580 may be adapted to serve as a forcing element. Split seal 580 may have a tapered outer surface that cooperates with an inner surface of female nut 530 to compress an end of repair tube 574 therebetween when female nut 530 is coupled to repair tube 574. Long seal 546 and inner tube 556 may be as described above with respect to long seal 46 and inner tube 56.

Figure 10:
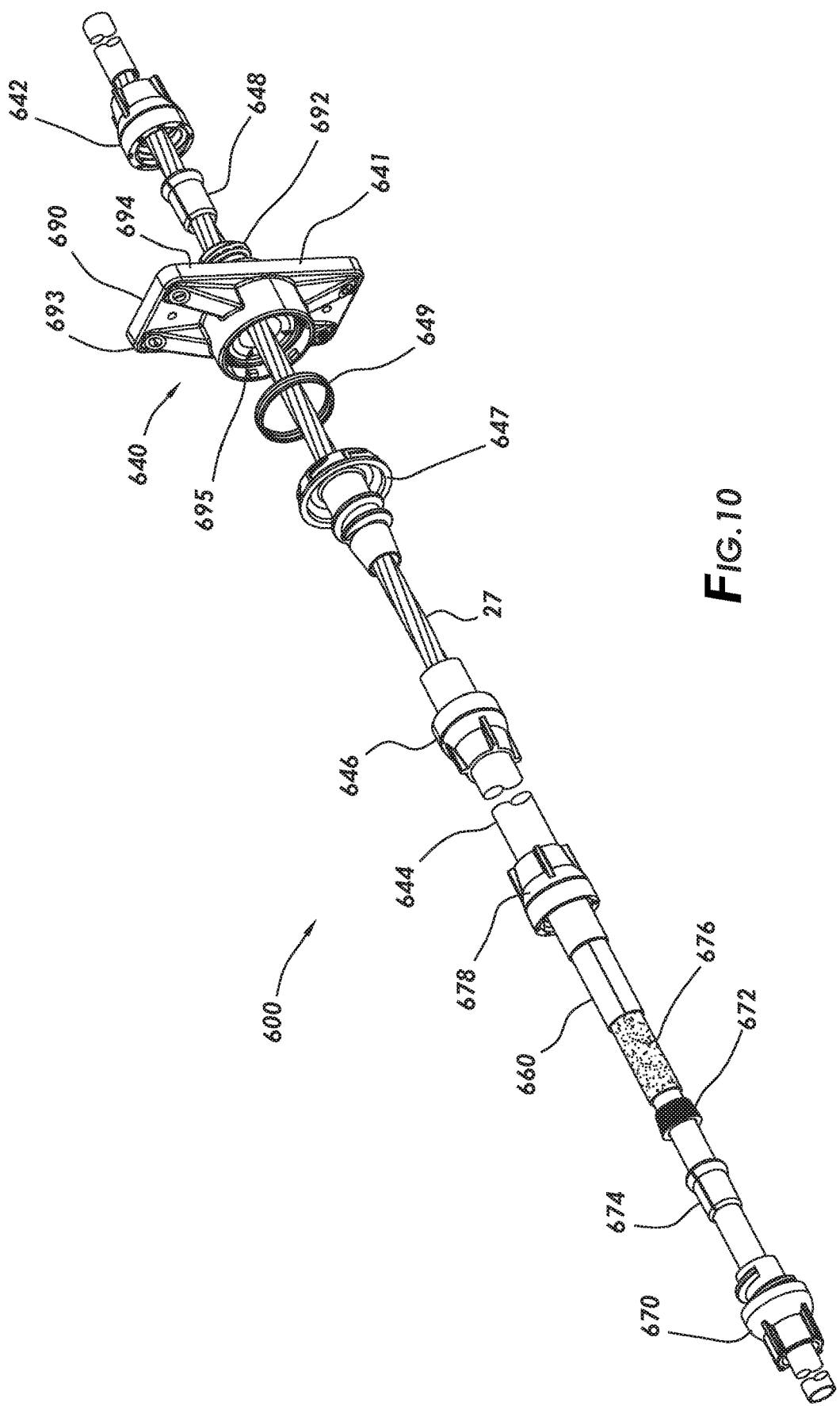
FIG. 10 is an exploded view of a sealing assembly consistent with certain embodiments of the present disclosure that is adapted for use with an anchor, such as an intermediate post tensioning anchor

FIG. 10 depicts sealing assembly 600 consistent with certain embodiments of the present disclosure that is adapted for use with an anchor, such as intermediate post tensioning anchor 690. Sealing assembly 600 includes first sealing device 640 and second sealing device 660. First sealing device 640 may include female nut 642, male nut 646, split seal 648, mandrel/pocket former 647, gasket 649, and repair tube 644.

Split seal 648 may include a longitudinal split that enables split seal 648 to be applied to a tension member 27 from the side, i.e. without requiring access to the tension member end. Split seal 648 may be made of metal or of a soft elastomer, rubber, silicone, or other suitably deformable sealing material. Split seal 648 may be sized to fit in the annular space between female nut 642 and tension member 27.

Intermediate post tensioning anchor 690 may include anchor body 691 covered by encapsulation 693, having encapsulation extension 692. The combination of split seal 648, female nut 642, and encapsulation extension may form a seal. Back end 695 of anchor body 691 is adapted to receive gasket 649 and mandrel/pocket former 647.

Second sealing device 660 may be formed as described above with respect to FIGS. 5 and 6, having male nut 670, forcing element 672, and two split seals 674, 676 positioned on either side of forcing element 672. Female nut 678 fits with male nut 670, as described with respect to FIG. 6.

When assembled, sealing assemblies 200, 300, 600, and sealing devices 400, 500 each define a longitudinal passage that is adapted to receive a tension member and sealingly engage the outer surface thereof. The presence of a sealing assembly 200, 300 or sealing device 400, 500 on tension member 27 seals the portion of the tension member that is within the assembly, e.g., between male nut 210 and female nut 230. In each embodiment and each method described herein, repair of a sheathing layer may be for the purpose of re-sealing a sheath that has become damaged or replacement of a sheathing layer on a portion of strand from which the sheathing has been removed.

In some embodiments, an assembly for use with a tension member for post-tensioning concrete may include an anchor body, an encapsulation, wherein the encapsulation at least partially encapsulates the anchor body and wherein the encapsulation includes a rear encapsulation extension and a front encapsulation extension, a rear nut mechanically coupled to the rear encapsulation extension, a cap mechanically coupled to the front encapsulation extension, the cap including a cap extension, a cover extending around a portion of the tension member, the cover being tubular and having a proximal end portion and a remote end portion, a coupler mechanically coupled to both the cap extension and the proximal end portion, and a remote nut mechanically coupled to the remote end portion.

The assembly may further include a rear seal positioned between the rear encapsulation extension and the tension member, a front seal positioned between the cap extension and the tension member, a proximal seal positioned between the proximal end portion and the tension member, and a remote seal positioned between the remote end portion and the tension member. The rear, front, proximal, and remote seals may each be a split seal. The rear, front, proximal, and remote seals may each be sized such that tightening the rear nut, coupler and remote nut to a desired degree deforms the rear, front, proximal, and remote seals such that there are substantially no internal voids in the assembly.

In some embodiments, the assembly may further include a rear seal positioned between the rear extension and the tension member and the rear seal may include a head compressed in an axial direction between the rear nut and rear encapsulation extension.

In some embodiments, the assembly may further include a front seal positioned between the cap extension and the tension member, a proximal seal positioned between the proximal end portion and the tension member, and a long seal positioned between the tension member and the cover and the front seal and the proximal seal may each include a head compressed in an axial direction between the cap extension and the long seal.

In some embodiments, the assembly may further include a remote seal positioned between the remote end portion and the tension member and the rear seal may include a head compressed in an axial direction between the remote nut and the remote end portion of the cover.

In some embodiments, the coupler may mechanically couple to the cap extension at a first threaded interface and may mechanically couple to the proximal end portion at a second threaded interface. The second threaded interface may be reversed with respect to the first threaded interface.

The assembly may further include a cap seal disposed in an annular groove formed in the cap, wherein the cap seal engages at least one of the anchor body or the encapsulation.

In some embodiments, a method for providing an intermediate anchor and cover on a tension member for post-tensioning concrete, may include the steps of a) positioning components of an intermediate anchor and cover assembly on the tension member at desired locations, the components comprising: an anchor body, an encapsulation, wherein the encapsulation at least partially encapsulates the anchor body and wherein the encapsulation includes a rear encapsulation extension and a front encapsulation extension, a rear nut, a cap, wherein the cap includes a cap extension, a cover, wherein the cover is tubular and has a proximal end portion and a remote end portion, a coupler; and a remote nut; b) mechanically coupling the cap to the front encapsulation extension; c) positioning a rear seal between the rear encapsulation extension and the tension member and mechanically coupling the rear nut to the rear encapsulation extension; d) positioning a front seal between the cap extension and the tension member; e) positioning a long seal at a desired location on the tension member; f) positioning the cover around the tubular long seal; g) positioning a proximal seal between the proximal end portion and the tension member; h) mechanically coupling the coupler to the cap extension and the proximal end portion; and i) positioning a remote seal between the remote end portion and the tension member and mechanically coupling the remote nut to the remote end portion.

In some embodiments, a kit for assembling an intermediate anchor and cover assembly for use with a tension member for post-tensioning concrete may include: an anchor body; an encapsulation, the encapsulation at least partially encapsulating the anchor body and including a rear encapsulation extension and a front encapsulation extension; a rear nut adapted to mechanically couple to the rear encapsulation extension; a cap adapted to mechanically couple to the front encapsulation extension, the cap including a cap extension; a cover adapted to extend around a portion of the tension member, the cover being tubular and having a proximal end portion and a remote end portion; a coupler adapted to mechanically couple to both the cap extension and the proximal end portion; and a rear nut adapted to mechanically couple to the remote end portion.

In various embodiments, the sheathing repair assembly may include an inner tube positioned between the outer tube and the tubular long seal. The first elastomeric seal may be configured such that mechanically coupling the first nut to the outer tube causes the first elastomeric seal to fill an annular space defined between the outer tube, the long seal, the tension member, and the first nut, and the second elastomeric seal may be configured such that mechanically coupling the second nut to the outer tube causes the second elastomeric seal to fill an annular space defined between the outer tube, the long seal, the tension member, and the second nut.

The outer tube may not have a longitudinal slit. The first and second elastomeric seals may each have a longitudinal slit. The long seal may have a longitudinal slit.

The tension member may have an unsealed portion and the long seal may be long enough to fully cover the unsealed portion. The long seal may be long enough to extend beyond the unsealed portion.

A method for repairing an unsheathed portion of a sheathed tension member may include the steps of: a) providing a sheathing repair assembly comprising an outer tube having first and second end portions, a tubular long seal sized to fit onto the tension member, a first elastomeric seal sized to fit onto the tension member, a second elastomeric seal sized to fit onto the tension member, a first nut adapted to mechanically couple to one end portion, and a second nut adapted to mechanically couple to one end portion, b) positioning the tubular long seal at the unsheathed portion, c) positioning the outer tube around the tubular long seal, d) inserting the first elastomeric seal into the first end portion and coupling the first nut to the first end portion so as to retain the first elastomeric seal therein, e) inserting the second elastomeric seal into the second end portion and coupling the second nut to the second end portion so as to retain the second elastomeric seal therein. The method may further include the step of positioning an inner tube between the tubular long seal and the outer tube before step d). The method may further include the step of removing the inner tube from between the tubular long seal and the outer tube before step d).

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure. Further, in the claims that follow, unless explicitly so recited, the sequential recitation of steps is not intended to require that the steps be performed sequentially.

What is claimed is:

1. A sheathing repair assembly for a tension member of a post-tensioning tendon, the tension member comprising a strand and a sheathing layer, the sheathing repair assembly comprising:
    a repair tube having first and second end portions;
    a first sealing assembly comprising:
        a first nut having a first frustoconical surface; and
        a first forcing element adapted to cooperate with the first frustoconical surface so as to compress the first end portion of the repair tube; and
    a second sealing assembly comprising:
        a second nut having a second frustoconical surface; and
        a second forcing element adapted to cooperate with the second frustoconical surface so as to compress the second end portion of the repair tube.

2. The sheathing repair assembly of claim 1 wherein the first and second end portions of the repair tube each includes an expansion portion that includes a tapered wall thickness, a flared wall diameter, longitudinal slots, longitudinal grooves, an internal friction device, or an external friction device.

3. The sheathing repair assembly of claim 1 wherein the first forcing element is a cap, the cap including a cap extension and an anchor-engaging end.

4. The sheathing repair assembly of claim 3 wherein the second forcing element is a split seal.

5. The sheathing repair assembly of claim 1 wherein the first nut is a female nut, the first forcing element is a barbed ferrule, and the sheathing repair assembly further includes a male nut.

6. The sheathing repair assembly of claim 5, further including a seal between the barbed ferrule and the female nut.

7. The sheathing repair assembly of claim 6, further including a washer between the seal and the male nut.

8. The sheathing repair assembly of claim 7 wherein coupling the male nut with the female nut urges the barbed ferrule into engagement with the sheathing layer.

9. The sheathing repair assembly of claim 1, further including a long seal between the repair tube and the strand.

10. The sheathing repair assembly of claim 9, further including an inner tube between the long seal and the repair tube.

11. A method for repairing an unsheathed portion of a tension member, the tension member comprising a strand and a sheathing layer, the method comprising the steps of:
    a) providing a sheathing repair assembly comprising:
        a first sealing assembly comprising:
            a first nut having a first frustoconical surface; and
            a first forcing element adapted to cooperate with the first frustoconical surface so as to compress the first end portion of the repair tube; and
        a second sealing assembly comprising:
            a second nut having a second frustoconical surface; and
            a second forcing element adapted to cooperate with the second frustoconical surface so as to compress the second end portion of the repair tube;
    b) positioning the repair tube so as to enclose the unsheathed portion;
    c) positioning the first nut and the first forcing element adjacent to the first end portion;
    d) positioning the second nut and the second forcing element adjacent to the second end portion;
    e) compressing the first end portion of the repair tube between the first forcing element and the first frustoconical surface; and
    f) compressing the second end portion of the repair tube between the second forcing element and the second frustoconical surface.

12. The method of claim 11 wherein the first and second end portions of the repair tube each includes an expansion portion that includes a tapered wall thickness, a flared wall diameter, longitudinal slots, longitudinal grooves, an internal friction device, or an external friction device, or a combination thereof.

13. The method of claim 11 wherein step a) includes providing an intermediate post-tensioning concrete anchor and wherein the first forcing element is a cap, the cap including a cap extension and an anchor-engaging end, further including a step of mechanically coupling the anchor-engaging end to the intermediate post-tensioning concrete anchor.

14. The method of claim 11 wherein at least one forcing element is a split seal.

15. The method of claim 11 wherein the first nut is a female nut, wherein the first forcing element is a barbed ferrule, wherein the assembly further includes a male nut configured to mechanically couple to the female nut, and wherein step d) comprises mechanically coupling the male nut to the female nut.

16. The method of claim 15 wherein the sealing assembly further includes a seal between the barbed ferrule and the female nut.

17. The method of claim 16 wherein the sealing assembly further includes a washer between the seal and the male nut.

18. The method of claim 15 wherein engagement of the male nut with the female nut urges the barbed ferrule into engagement with the sheathing layer.

19. The method of claim 11 wherein the sealing assembly further includes a long seal between the repair tube and the strand.

20. The method of claim 19 wherein the sealing assembly further includes an inner tube between the long seal and the repair tube.

* * * * *